(12) United States Patent
Kim

(10) Patent No.: US 12,540,623 B2
(45) Date of Patent: Feb. 3, 2026

(54) AXIAL GAP-TYPE ELECTRIC MOTOR FOR WATER PUMP (EWP)

(71) Applicant: AMOTECH CO., LTD., Incheon (KR)

(72) Inventor: Byung Soo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 19/015,617

(22) Filed: Jan. 9, 2025

(65) Prior Publication Data

US 2025/0146491 A1    May 8, 2025

Related U.S. Application Data

(63) Continuation-in-part of application No. PCT/KR2023/008791, filed on Jun. 23, 2023.

(30) Foreign Application Priority Data

Jul. 29, 2022    (KR) ........................ 10-2022-0094528

(51) Int. Cl.
*F04D 13/06*    (2006.01)
*H02K 1/2795*    (2022.01)

(52) U.S. Cl.
CPC ....... *F04D 13/064* (2013.01); *F04D 13/0666* (2013.01); *F04D 13/0686* (2013.01); *H02K 1/2795* (2022.01)

(58) Field of Classification Search
CPC ............. F04D 13/0666; F04D 13/0686; F04D 13/064; H02K 1/2795; H02K 21/026
USPC ...................................................... 417/423.7
See application file for complete search history.

(56) References Cited

U.S. PATENT DOCUMENTS

| | | | | |
|---|---|---|---|---|
| 2,752,857 | A | * 7/1956 | White | ................. F04D 13/0666 310/104 |
| 2012/0319542 | A1 | * 12/2012 | Hazeyama | ............. H02K 11/02 310/68 D |
| 2020/0021179 | A1 | * 1/2020 | Takahashi | ............ H02K 1/2798 |

(Continued)

FOREIGN PATENT DOCUMENTS

| | | |
|---|---|---|
| JP | 08214475 A | 8/1996 |
| JP | 2004278539 A | 10/2004 |
| KR | 20130135664 A | 12/2013 |

(Continued)

OTHER PUBLICATIONS

International Search Report—PCT/KR2023/008791 dated Oct. 27, 2023.

*Primary Examiner* — Thomas Fink
(74) *Attorney, Agent, or Firm* — CANTOR COLBURN LLP

(57) ABSTRACT

Provided is a water pump using an axial gap-type electric motor employing a rare-earth-free magnet. The water pump (EWP) includes: a pump housing having a space in a sealing state on one side thereof, in which, on the other side thereof, an inlet through which a fluid is introduced and an outlet through which the introduced fluid is discharged are connected through a fluid flow passage; a rotor rotatably supported on the fluid flow passage; an impeller integrally formed with the rotor on the upper side of the rotor; a stator arranged in the lower space to generate a rotating magnetic field to rotatably drive the rotor; and a waterproof partition wall arranged inside the pump housing to separate the rotor from the stator.

10 Claims, 18 Drawing Sheets

(56) References Cited

U.S. PATENT DOCUMENTS

2023/0179055 A1\* 6/2023 Heo ..................... H02K 11/33
 417/410.1

FOREIGN PATENT DOCUMENTS

| KR | 102191404 | B1 | 12/2020 |
| KR | 20210108844 | A | 9/2021 |

\* cited by examiner

AXIAL GAP-TYPE ELECTRIC MOTOR FOR WATER PUMP (EWP)

TECHNICAL FIELD

The present invention relates to an axial gap-type electric motor, and more particularly, to a water pump using an axial gap-type electric motor employing a rare-earth-free magnet in a rotor.

BACKGROUND ART

Generally, a water pump applied to a vehicle is a device for circulating cooling water. The water pump is forcibly driven by a belt to suck and discharge cooling water by rotating a pump impeller, thereby circulating cooling water. An engine-driven water pump or an electric water pump is representatively used in the inside of the water pump. The engine-driven water pump is assembled with a seal unit therein to prevent leakage of cooling water, and the electric water pump is driven by an electric motor driven by electricity provided by a battery or the like, and circulates cooling water by rotating an impeller by the electric motor to suck and discharge the cooling water.

In addition, since the electric water pump does not require the engine driving force of the vehicle compared to the engine-driven water pump, the engine efficiency is increased compared to the engine-driven water pump, and thus fuel efficiency is improved, and furthermore, the temperature of the cooling water may be precisely controlled, thereby being widely applied to various kinds of vehicles.

Among the electric water pumps, a canned type electric water pump is a pump driven by an electric motor having a can-shaped sealing container inside a stator. The canned type electric water pump has a structure in which a can structure is inserted between a rotor and a stator, and a hydraulic unit is extended to the rotor so that the rotor is immersed in the cooling water, thereby appropriately cooling, through the cooling water contacting the rotor, the frictional heat generated from the rotor.

Conventionally, the canned type electric water pump has a structure in which a magnet and a state core are positioned in a radial direction and water is introduced into the magnet, and needs a structure in which water should not be introduced into the stator (core winding portion), and thus has a waterproof structure using a waterproof can or an injection mold. As a result, an air gap between the rotor and the stator core is increased, and a large amount of magnetic flux loss is generated, and thus it is difficult to meet a desired pump (motor) capacity with a general magnet. As a result, expensive rare earth magnets are generally used.

In general, electric water pumps (EWP), compressors, oil pumps, etc., employ inner rotor-type electric motors, but in the case of inner rotor-type motors, the cross-sectional area of magnets (i.e., effective area) is small, and thus, performance is implemented while using rare earths, to thereby increase production costs.

In addition, the water pump motor employs an inner rotor-type motor, and the rare earth magnet (Nd—Fe—B) employed in the rotor contains iron components, and thus, rust may be generated in the magnet when contacting water, so the rotor portion also adopts a waterproof structure. Accordingly, the water pump motor has a structure in which an air gap between the rotor and the stator is increased, thereby increasing the amount of neodymium (Nd) used in the rotor magnet. However, when a rotor using a rare earth magnet is employed, the water pump motor may not prevent an increase in manufacturing cost.

The main reason for using rare-earth-free magnets instead of rare-earth magnets in electric motors is that rare-earth-free magnets are relatively inexpensive compared to rare-earth magnets. Accordingly, the design goal of the electric motor is to implement an electric motor with magnetic energy equal to that of an electric motor using rare earth magnets, even if inexpensive and low-magnetic rare-earth-free magnets are used.

In consideration of this, the inventor proposed, in Korean Patent Application Publication No. 10-2021-0108844 (Patent Document 1), a water pump with magnetic energy equal to that of an electric motor using a rare earth magnet, by reducing an air gap by completely isolating a rotor from a stator by using a thin waterproof partition wall between the rotor and the stator in an axial gap-type electric motor, even if a low-cost ferrite magnet, which is a rare-earth-free magnet, is used.

The axial gap-type electric motor for a water pump (EWP) of Patent Document 1 includes: a rotor rotatably supported on a fluid flow passage between a pump cover and a body case; a stator arranged in a lower space formed by the body case and an upper cover, and generating a rotating magnetic field to rotatably drive the rotor; and a waterproof partition wall arranged on top of the body case to separate the rotor from the stator, wherein the rotor includes an inexpensive ferrite magnet which is a rare-earth-free magnet.

However, in the axial gap-type electric motor for the water pump (EWP) of Patent Document 1, a support shaft that rotatably supports the rotor is integrally formed at the center of the waterproof partition wall, which is placed on the upper portion of a body case to separate the rotor from stator, or is press-fitted into a support shaft accommodating portion.

In this case, since the support shaft needs to be firmly fixed to the rotor rotated together with the impeller to discharge the cooling water introduced into one side to the other side, the waterproof partition wall should be formed to have a thickness that may have some durability. Therefore, the thickness of the waterproof partition wall acts as an obstacle to minimizing the air gap between the rotor and the stator.

Moreover, in the inner rotor-type motor, the inner shoe portion of the core of the stator facing the magnet of the rotor is not generally rounded or round (R)-processed, and thus the back-electromotive force (back-EMF) waveform may not be made into a sine curve, causing noise and vibration problems. That is, in general, the inside of the core is designed to form a concentric circle with respect to the center. Accordingly, the core structure of the conventional stator separately needs an auxiliary component or to be designed for improving noise and vibration problems.

In order to improve the generation of vibration and noise, conventionally, it is generally performed in a form in which a round (R) processing is applied to the magnet of the rotor. However, if the magnet is a segment structure, there is no problem, but if the magnet is an integral structure in which the magnet is divided and magnetized, it is difficult to perform a rounding process to obtain a round (R) shape.

Meanwhile, a conventional water pump motor has a problem that a separate component should be added in order to obtain an electromagnetic compatibility (EMC) improvement effect and an electromagnetic interference (EMI)

improvement effect by grounding between a core of a stator and a printed circuit board (PCB) on which a motor driving circuit is mounted.

DISCLOSURE

Technical Problem

It is an objective of the present invention is to provide a water pump for an axial gap-type electric motor, which may increase efficiency and torque equal to that of an electric motor using a rare earth magnet, even if a low-cost ferrite magnet, which is a rare-earth-free magnet, is used, as an air gap may be minimized by waterproofing the surface of a stator core facing a rotor by using an ultra-thin waterproof coating film while isolating the rotor from a stator using a thick-film waterproof partition wall between the rotor and the stator.

It is another objective of the present invention to provide a water pump for an axial gap-type electric motor, which has a magnetic energy equal to an electric motor using a rare earth magnet by reducing an air gap even if a ferrite magnet, which is a rare-earth-free magnet, is used.

It is another objective of the present invention to provide a water pump using an axial gap-type electric motor in which a core shape is optimized to minimize core loss generated in the motor by applying soft magnetic composites (SMC), not a general electric steel sheet (S-60), to a stator core (teeth) of a longitudinal-axis motor.

It is another objective of the present invention to provide a water pump using an axial gap-type electric motor, which is capable of improving noise and vibration generation by forming a round (R) shape as a core (teeth) shape to obtain a back electromotive force (back-EMF) waveform as a sine curve shape, by manufacturing the teeth of a stator core by means of a compression molding method using soft magnetic composites (SMC) powder.

Technical Solution

According to an aspect of the present invention, there is provided a water pump including: a pump cover having an inlet through which a fluid is introduced and an outlet through which the introduced fluid is discharged, at one side and the other side thereof, respectively; a body case coupled to the pump cover to form a fluid flow passage inside the pump cover and having a lower space; an upper cover coupled to a lower end of the body case to set the lower space as a sealing state; a rotor rotatably supported on the fluid flow passage; an impeller integrally formed with the rotor on the upper side of the rotor; a stator arranged in the lower space to generate a rotating magnetic field to rotatably drive the rotor; and a waterproof partition wall arranged on top of the body case to separate between the rotor and the stator, wherein the stator includes a plurality of teeth that are embedded such that the front end portion thereof is embedded in the waterproof partition wall to be exposed to the fluid flow passage, wherein a waterproof coating film made of a thinner film than the waterproof partition wall is formed at the front end portion of the plurality of teeth exposed to the fluid flow passage.

The waterproof coating film may serve as an air gap between the rotor and the stator. In this case, the waterproof partition wall and the waterproof coating film may form a plane on a same level.

In addition, the rotor includes: a plurality of magnets arranged in an annular shape; and a back yoke installed on the rear surfaces of the magnets to form a magnetic circuit, wherein the magnets may be rare-earth-free magnets.

Furthermore, the stator includes: a stator core having a plurality of teeth and a back yoke interconnected with the plurality of teeth to form a magnetic circuit; a plurality of bobbins made of an insulating material integrally formed to surround an outer circumferential surface on which a coil of each of the plurality of teeth is wound, and a coil wound around the outer circumferential surfaces of the bobbins, wherein each of the plurality of teeth may include soft magnetic composites (SMC) powder, the back yoke may be formed by stacking a plurality of electrical steel sheets, each of the plurality of teeth is annularly arranged parallel to the axial direction on the same circumference so as to be arranged to face the magnet of the rotor, and the front end portions of the plurality of teeth may be embedded in the waterproof partition wall so as to be exposed to the fluid flow passage.

In this case, each of the plurality of teeth includes: a coil winding portion on which the coil is wound; and a shoe having a flange extending from the coil winding portion, wherein the shoe may include a stepped portion in which a waterproof partition wall is formed to extend at a corner between the side surface of the flange and the exposed surface facing the magnet of the rotor to prevent the teeth from being separated by magnetic force, and a C-shaped curved surface portion connecting the exposed surface with the stepped portion.

In addition, each of the plurality of bobbins may include: a coil winding body having a through hole at a center thereof, in which the coil winding portion of each of the teeth is inserted into the through hole and a coil wound around an outer circumference thereof; upper and lower flanges configured to define a region in which the coil is to be wound on both ends of the coil winding body, and first and second alignment guide protrusions formed on the lower flange to fix a start line and an end line of the coil and then to align the start line and the end line of the coil at regular intervals.

The water pump (EWP) according to the present invention further includes a printed circuit board (PCB) on which various electronic components for forming a motor driving circuit for applying a driving signal to U, V, and W 3-phase coils of the stator are mounted, wherein the PCB includes: a via hole region which is arranged in the outermost portion of the PCB, in which a plurality of conductive via holes are formed and a start line and an end line of each of a plurality of coils wound on each of the plurality of teeth are introduced into the PCB to be selectively connected; a connection pattern region disposed inside the via hole region and having a plurality of conductive patterns for interconnecting the start line and the end line of each of the plurality of coils so as to form a parallel connection circuit or a serial connection circuit of the plurality of coils for each phase; and an electronic component mounting region which is located inside the connection pattern region and in which various electronic components for forming the motor driving circuit are mounted.

In addition, the PCB may include a multilayer substrate, and the plurality of coils may be connected to one common electrode so as to form a parallel connection circuit for each phase, wherein the start lines of the plurality of coils are interconnected to the conductive pattern, and all of the end lines form a Y-connection neutral point, which may be connected to a common electrode COM.

Furthermore, the stator includes: a plurality of teeth annularly arranged on the same circumference in parallel to the axial direction so as to face the magnet of the rotor; and a back yoke connected to the plurality of teeth at a right angle to form a magnetic circuit, wherein the front end portions of the plurality of teeth may be embedded in the waterproof partition wall so as to be exposed to the fluid flow passage.

The water pump (EWP) according to the present invention further includes: a support shaft accommodation portion integrally extending in a lower space direction at the center of the waterproof partition wall and having first to third end grooves formed at the center thereof; a support shaft having a lower end portion supported on a third end groove of the support shaft accommodation portion; a sleeve bearing coupled to the outer periphery of the support shaft to rotatably support the rotor and to have the lower end portion supported by the second groove, and a bearing housing accommodating the sleeve bearing and having the lower end portion inserted into the first end groove, wherein the bearing housing may be connected to the center of the stator support integrally formed in a lower plate of the impeller and accommodating the rotor therein.

In addition, according to another aspect of the present invention, there is provided a water pump including: a pump housing having a space in a sealing state on one side thereof, in which, on the other side thereof, an inlet through which a fluid is introduced and an outlet through which the introduced fluid is discharged are connected through a fluid flow passage; a rotor rotatably supported on the fluid flow passage; an impeller integrally formed with the rotor on the upper side of the rotor; a stator arranged in the lower space to generate a rotating magnetic field to rotatably drive the rotor; and a waterproof partition wall arranged inside the pump housing to separate the rotor from the stator, wherein the stator includes a plurality of teeth that are embedded such that the front end portion thereof is embedded in the waterproof partition wall to be exposed to the fluid flow passage, wherein a waterproof coating film made of a thinner film than the waterproof partition wall is formed at the front end portion of each of the plurality of teeth exposed to the fluid flow passage.

The rotor and the stator form an axial gap-type electric motor, and the rotor may include a ferrite magnet.

In addition, each of the plurality of teeth has a flange extending from the coil winding portion in the shoe facing the rotor, and the shoe may include a stepped portion in which a waterproof partition wall is formed to extend at a corner between the side surface of the flange and the exposed surface facing the magnet of the rotor to prevent the teeth from being separated by magnetic force, and a C-shaped curved surface portion connecting the exposed surface with the stepped portion.

Moreover, the coil winding part may be formed of a triangular pillar, and the shoe may have a trapezoidal cross section.

In addition, the teeth may be compression-molded or extruded by using any one of amorphous metal powder, spherical soft magnetic powder, and an alloy powder in which amorphous metal powder and spherical soft magnetic powder are mixed.

Advantageous Effects

As described above, the axial gap-type electric motor of the present invention may have efficiency equal to or greater than the efficiency of an electric motor using expensive rare earth magnets and magnetic energy equal to the magnetic emery of an electric motor using expensive rare earth magnets by increasing the area of a low-cost ferrite magnet while applying a longitudinal-axis type electric motor with the same outer diameter as a general inner rotor-type electric motor.

Furthermore, in this invention, the air gap may be minimized by waterproofing the surface of the SMC type stator core (teeth) facing the rotor while separating between the rotor and the stator using a thick-film waterproof partition wall, and thus, even if a ferrite magnet, which is a rare-earth-free magnet, is used, an increase of efficiency and torque equivalent to those of an electric motor using a rare earth magnet including Nd may be achieved.

Since the conventional waterproof partition wall installed to separate the rotor from the stator has to perform the role of supporting the support shaft of the rotor at the central portion at the same time, the waterproof partition wall made of resin such as polyphenylene sulfide (PPS) has to be formed to a thickness of 0.9 mm and has a limit in reducing the thickness.

However, when the surface of the SMC type stator core (teeth) is waterproof-treated by the waterproof coating film of the ultra-thin film, it is possible to form the waterproof coating film to have a thickness of 0.2 mm, thereby significantly reducing the air gap compared to the waterproof partition wall structure of the thick film, and thus it is possible to use a ferrite magnet having a relatively low magnetic flux density as compared to the rare earth magnet.

Moreover, the electric motor of the present invention adopts an axial gap-type in which a rotor and a stator using a ferrite magnet face each other with a waterproof partition wall therebetween, and may be used as an open structure without the need for a separate magnet waterproof structure as in a rare earth magnet. In other words, because ferrite magnets include oxides of iron (Fe) as a main component, the ferrite magnets do not rust well, and thus, unlike when using rare earth magnets (Nd magnets), there is no need to consider a waterproof structure on the surface of a magnet exposed to water. Therefore, when a ferrite magnet is employed in a rotor, a waterproof structure is not required at portions in contact with water, thereby further reducing the air gap. This reduction of the air gap minimizes the leakage magnetic flux between the stator core and the magnet of the rotor, thereby increasing the efficiency of the electric motor.

In this case, the axial gap-type electric motor for the water pump (EWP) of the present invention has a support shaft accommodating portion in which a support shaft that rotatably supports the rotor is integrally formed in the center of the waterproof partition wall of the thick film to separate the rotor from the stator, and the support shaft may be press-fitted into the support shaft accommodating portion.

In the present invention, even if a support shaft accommodation portion is formed on the waterproof partition wall of the thick film, an air gap is determined by an ultra-thin waterproof coating film formed on the surface of the stator core (teeth), in a portion where the air gap is determined between the rotor and the stator core (teeth), and thus, the air gap may be determined regardless of the thickness of the waterproof partition wall.

In the present invention, the stator core (teeth) of the longitudinal-axis type electric motor may employ soft magnetic composites (SMC) instead of a general electric steel sheet (S-60) to optimize the shape of the core (teeth) so as to minimize iron loss generated in the electric motor.

In addition, in the present invention, by manufacturing a stator core (teeth) by a compression molding method using soft magnetic composites (SMC) powder, a round (R) shape is formed in the core shape to obtain a back electromagnetic force (back-EMF) waveform in a sine curve shape, thereby improving noise and vibration generation.

BEST MODE FOR CARRYING OUT THE INVENTION

Figure 1:
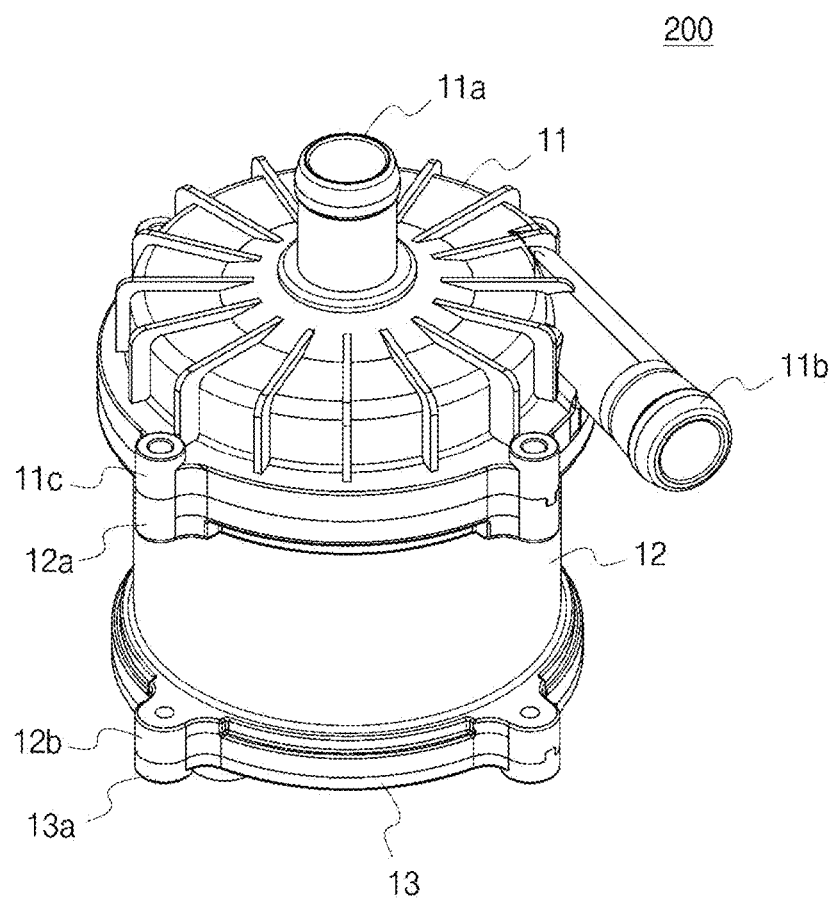
FIG. 1 is a perspective view of a water pump using an axial gap-type electric motor according to an embodiment of the present invention.
Figure 2A:
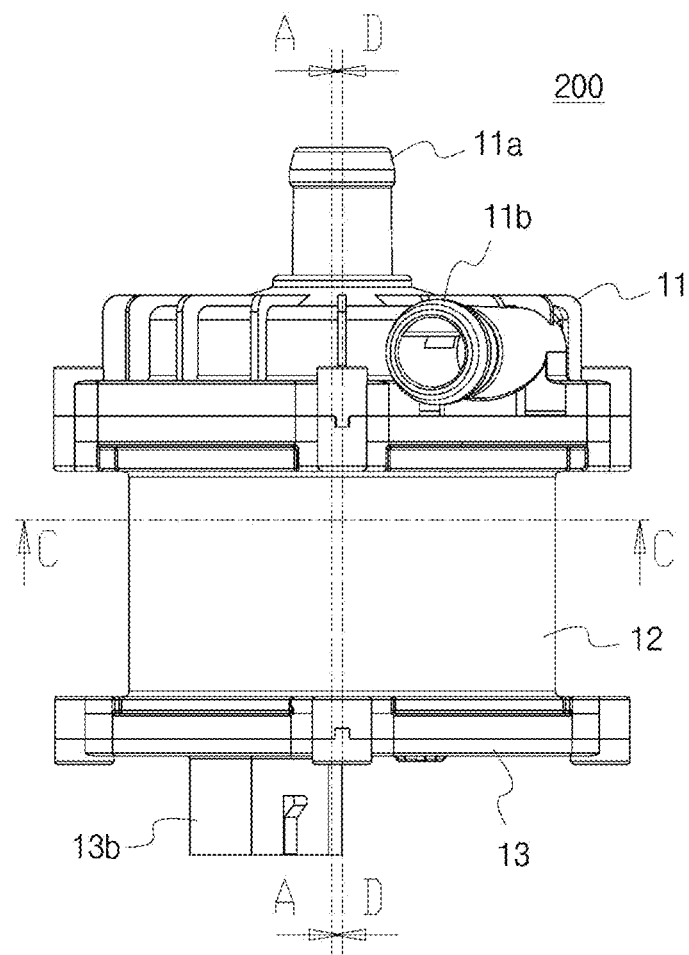
FIGS. 2A and 2B are a front view and a right side view of the water pump shown in FIG. 1, respectively.
Figure 2B:
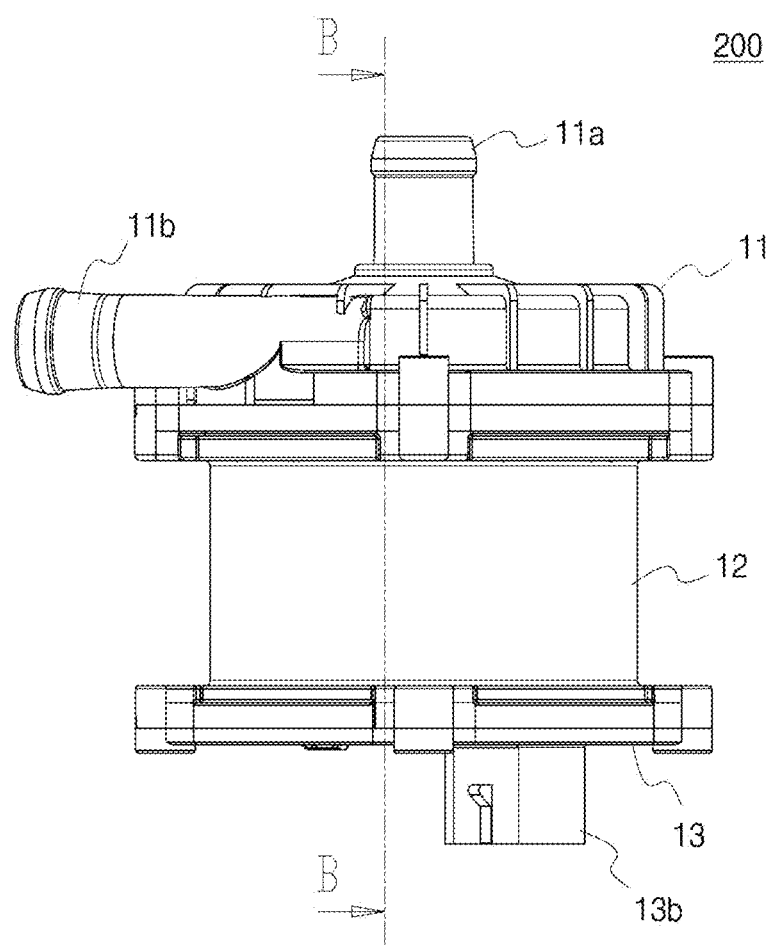
Figure 3:
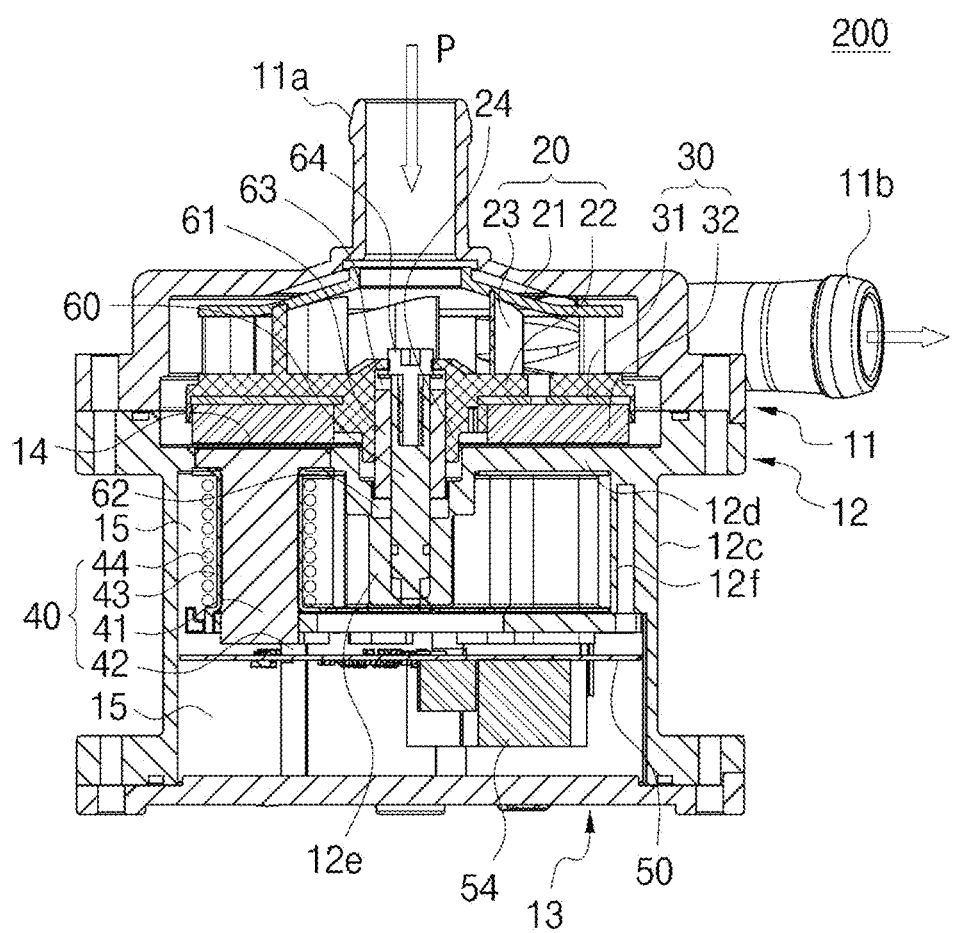
FIG. 3 is a cross-sectional view taken along line A-A of FIG. 2A.
Figure 4:
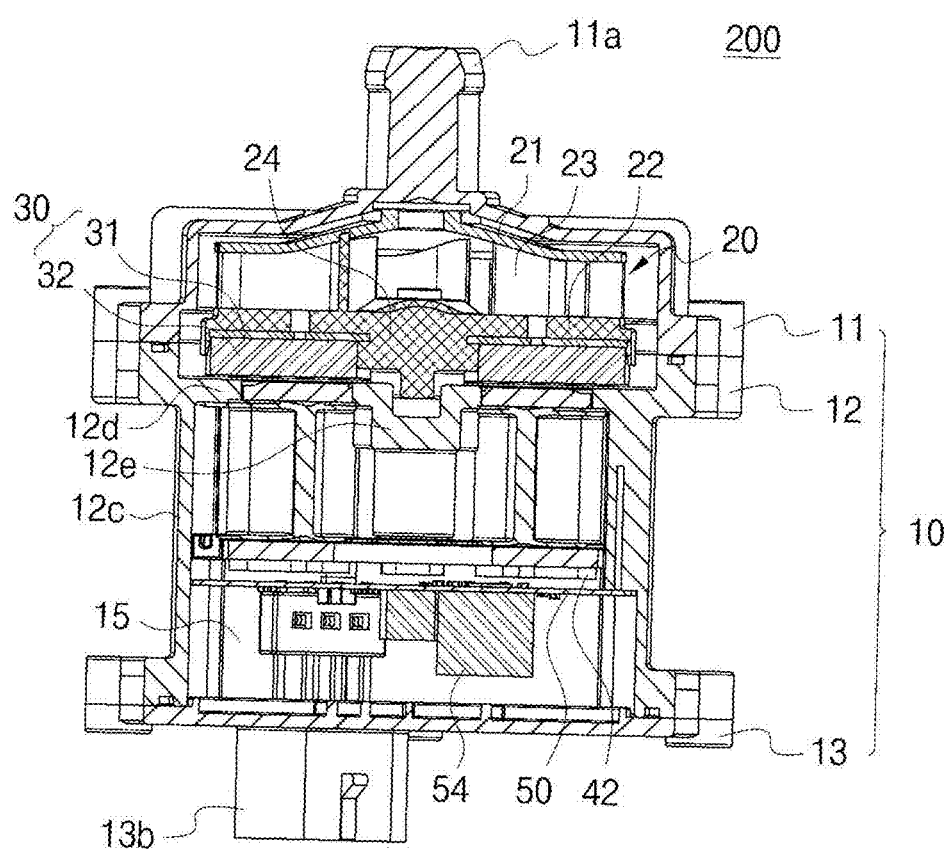
FIG. 4 is a cross-sectional view taken along line B-B of FIG. 2B.
Figure 5:
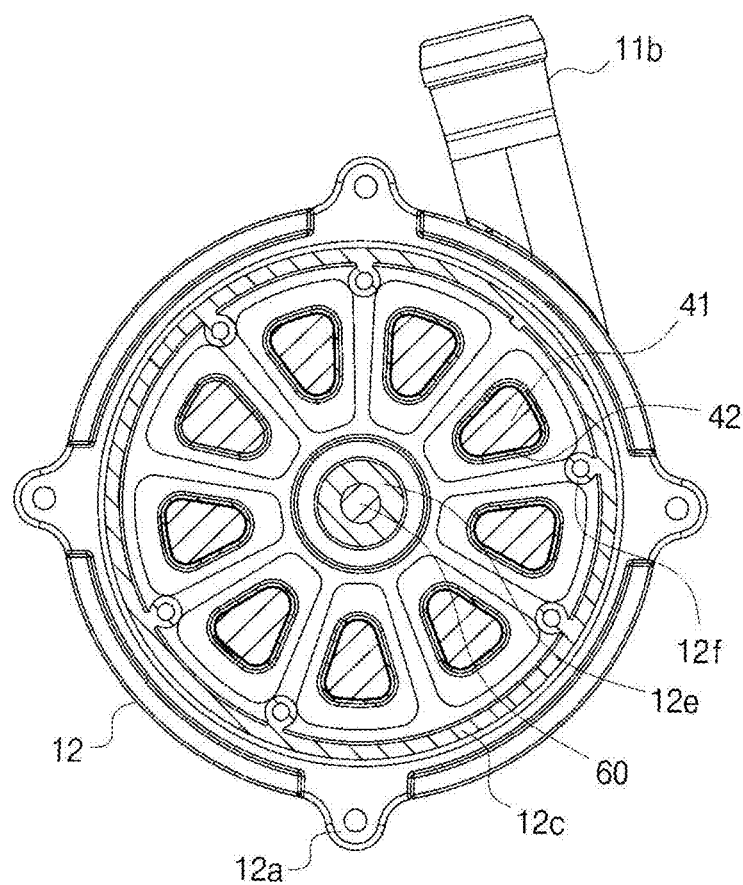
FIGS. 5 and 6 are cross-sectional views taken along lines C-C and D-D of FIG. 2A, respectively.
Figure 6:
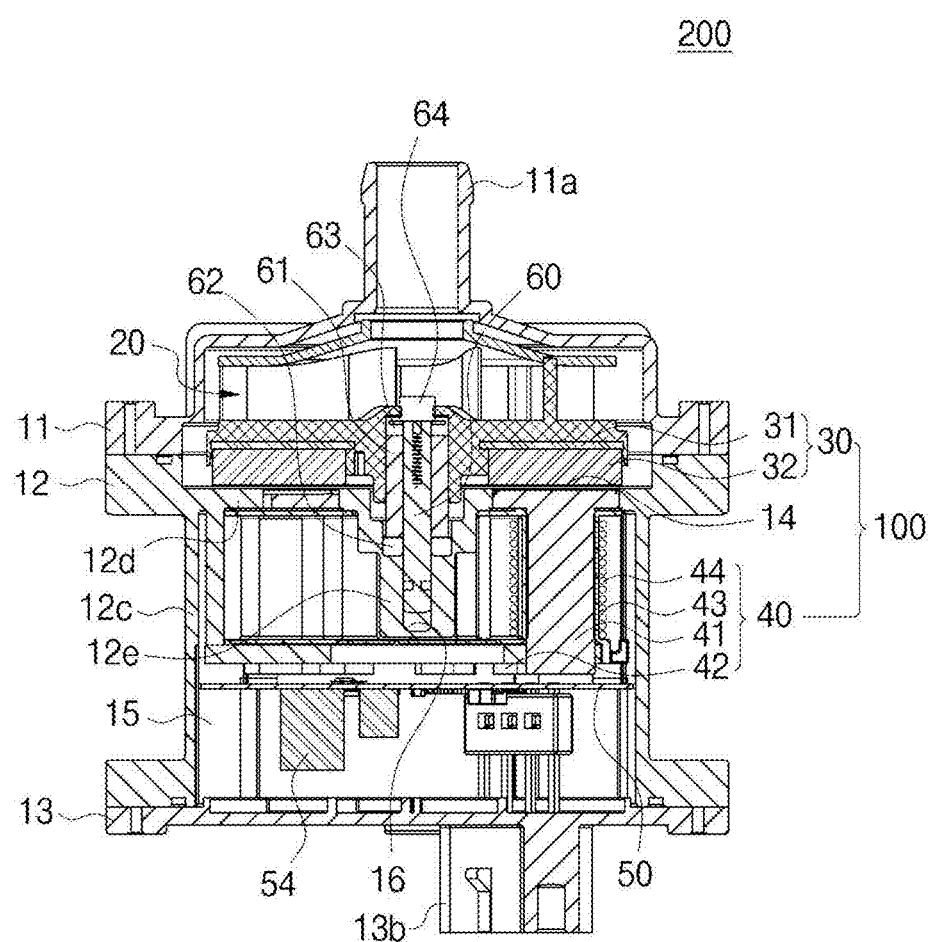
Figure 7A:
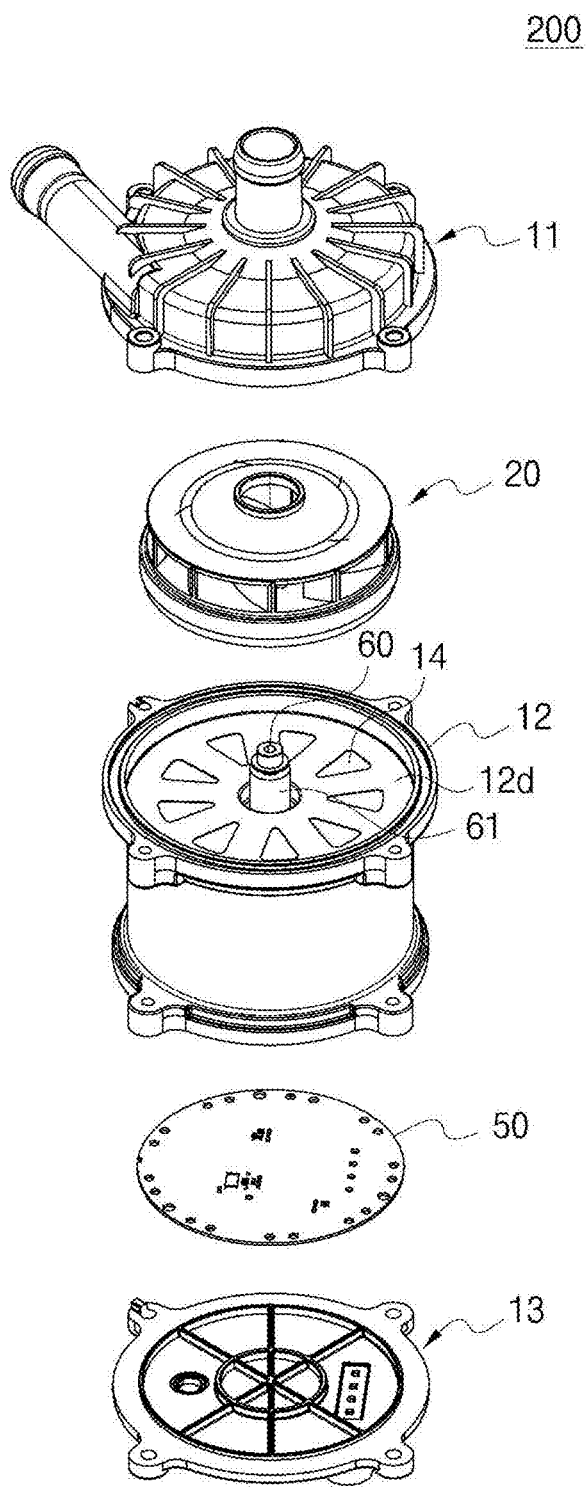
FIGS. 7A and 7B are respectively an exploded perspective view for each assembly and a completely exploded perspective view of a water pump according to an embodiment of the present invention.
Figure 7B:
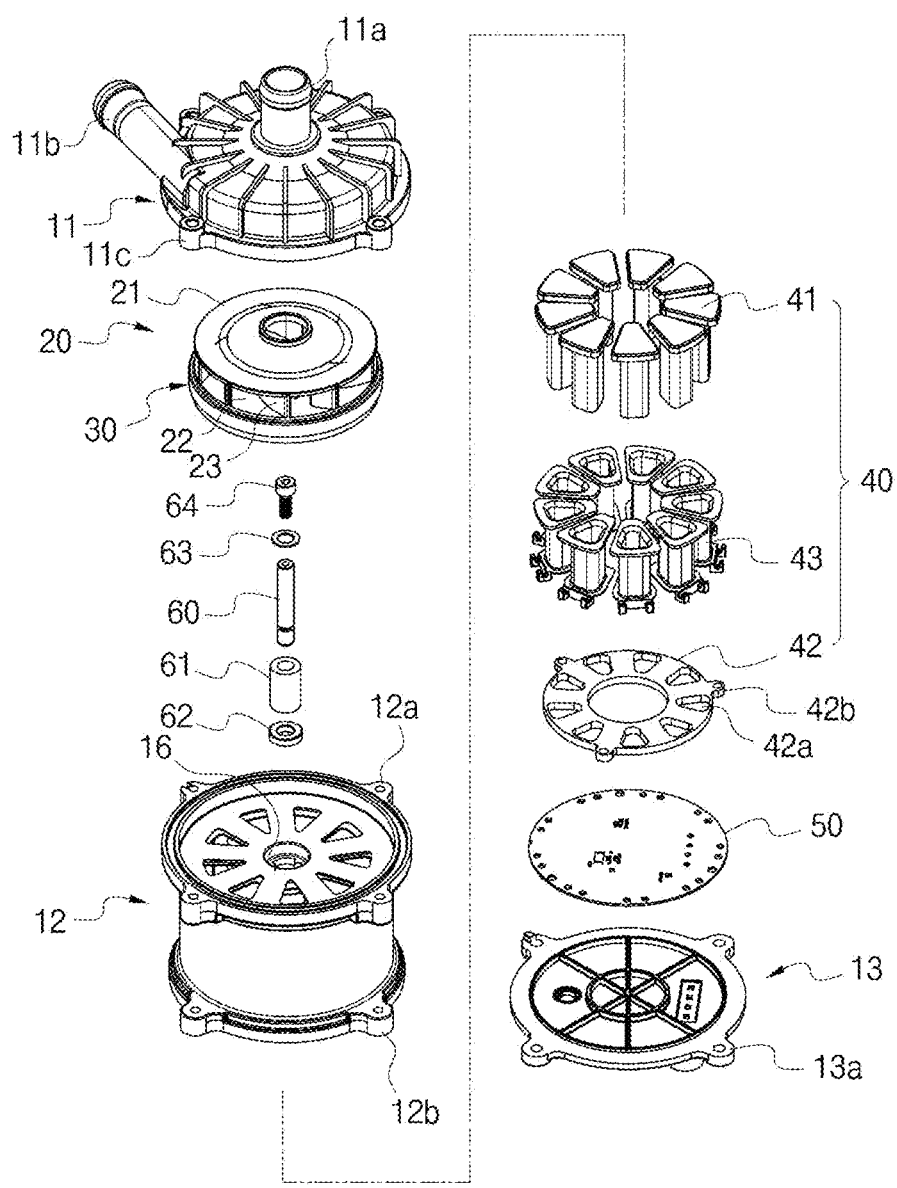

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

An axial gap-type electric motor employing a rare-earth-free magnet according to an embodiment of the present invention may be implemented as a longitudinal-axis type electric motor, and is applied to an electric water pump (EWP), a compressor, an oil pump, etc., containing the motor therein, and an example in the following description will be described with respect to the case in which the axial gap-type electric motor is applied to the water pump (EWP).

Referring to FIGS. 1 to 9, the water pump (EWP) 200 using the axial gap-type electric motor according to the present invention largely includes a pump housing 10, an axial gap-type electric motor 100, an impeller 20, and a driver 50.

The pump housing 10 includes: a pump cover 11 having an inlet 11a through which a fluid, such as cooling water, is introduced, and which is arranged at the center of one end thereof, and an outlet 11b through which the introduced fluid is discharged, and which is extended and formed at one side of the other end thereof, and the central portion of the other end thereof is opened; an inverted cup-shaped body case 12 that covers the opening of the pump cover 11 to form a fluid flow passage P inside the pump cover 11 and to have a lower space 15 outside the fluid flow passage P; and an upper cover 13 coupled to a lower end of the body case 12, in which a lower space 15 sealed from inside the body case 12 is formed to house the stator 40 of the electric motor 100 and a driver 50 for driving the stator 40.

The pump cover 11 and the body case 12 preferably have a cylindrical shape and have a coupling structure fixed to each other.

For the mutually fixed coupling between the pump cover 11 and the body case 12, for example, four fixing extension portions 11c and 12a protrude, and thus are respectively fastened to coupling holes with fixing screws or fixing bolts, in which the coupling holes are formed at the centers of the four fixing extension portions 11c and 12a.

Among the four fixing extension portions 11c and 12a, the fixing extension portion 12a of the body case 12 is provided with an alignment groove 12i for aligning the coupling position with the fixing extension portion 11c of the pump cover 11, and a coupling protrusion coupled to the alignment groove 12i is formed in the fixing extension portion 11c of the pump cover 11.

In addition, a circular protrusion and a circular groove 12h are formed in each flange between the pump cover 11 and the body case 12, and an O-ring for sealing is inserted into the groove 12h.

Furthermore, an O-ring may be inserted into a coupling portion between the body case 12 and the upper cover 13 to maintain the sealing state of the lower space 15. In addition, the coupling portion between the body case 12 and the upper cover 13 may be bonded by using a laser welding method to realize a more complete sealing state.

A connector housing 13b where a terminal end for applying a driving signal to the driver 50 from the outside is arranged is extended on the lower surface of the upper cover 13.

The pump cover 11, the body case 12, and the upper cover 13 forming the pump housing 10 may be formed of, for example, a resin such as polyphenylene sulfide (PPS).

The impeller 20 in which the rotor 30 of the electric motor 100 is integrally formed at the lower side of the fluid flow passage P is arranged in the fluid flow passage P of the bent portion between the inlet 11a and the outlet 11b of the pump cover 11.

In addition, the open lower end of the pump cover 11 is extended to secure a larger space than the inlet 11a so that the impeller 20 may be arranged in the fluid flow passage P, and the flange is extended to form a groove structure on the body case 12 corresponding to the open lower end of the pump cover 11.

A plurality of wings 23 are radially arranged between the disk-shaped upper plate 21 and the lower plate 22 to discharge a fluid such as cooling water introduced from the inlet 11a through the outlet 11b arranged at the side surface of the pump cover 11. The upper plate 21 has a through hole formed at the center thereof and a diameter of the upper plate 21 increases from the upper side to the lower side, in a narrow-top and wide-bottom form, and the lower plate 22 has a circular plate surrounding the upper side and the outer side of the rotor 30. Therefore, the lower plate 22 may act as a rotor support, and the lower plate 22 and the rotor 30 may be integrated by an insert molding method.

In addition, a bearing housing 24 is formed to protrude from the center of the lower plate 22, and the bearing housing 62 is provided with a sleeve bearing 61 embedded to rotatably support the rotor 20 on the support shaft 60.

It is desirable to use an oil-less bearing, such as a carbon bearing or a plastic bearing in consideration of the fact that the sleeve bearing 61 is in contact with the fluid.

Meanwhile, as shown in FIGS. 3 to 9, as a driving means for rotating the impeller 20, the water pump 200 according to the present invention employs an axial gap-type electric motor 100, which includes a core-type stator 40 arranged in a sealed lower space 15 inside the body case 12 and a rotor 30 arranged to face the stator 12 in the fluid flow passage P outside the body case 12.

First, the rotor 30 has a ring-shaped back yoke 31 and a magnet 32 installed sequentially on the bottom surface of the lower plate 22 to form a single body with the impeller 20. The magnet 32 of the rotor 30 may be formed of a plurality of N-pole and S-pole split magnet segments, or may use a magnet in which the N-pole and S-pole are split and magnetized into multiple poles in a ring-shaped magnet, and the back yoke 31 is installed on the rear surface of the magnet 32 to form a magnetic circuit, for example, by blanking an electro galvanized iron (EGI) sheet into a ring shape.

A waterproof partition wall 12*d* for separating the stator 40 from the rotor 30 is installed on the body case 12 to implement a complete waterproof structure for the stator 40. That is, the stator 40 arranged in the sealed lower space 15 inside the body case 12 may completely block contact with water by the waterproof partition wall 12*d*.

A support shaft accommodation portion 12*e* in which the support shaft 60 is integrally formed by an insert molding method is extended to the lower space 15 at a central portion of the waterproof partition wall 12*d*, and the rotor 30 is rotatably supported on the support shaft 60.

A groove 16 having a three-step stepped structure is formed at the center of the support shaft accommodation portion 12*e*, a support shaft 60 is installed at a center of the groove 16, that is, a third-step stepped portion, and a lower end portion of a sleeve bearing 61 and a lower end portion of the bearing housing 62 are supported by the first-step and second-step stepped portions of the groove 16, respectively. In this case, a support washer 62 is inserted into the second-step stepped portion of the groove 16 to minimize friction with the lower end portion of the sleeve bearing 61.

A washer 63 is coupled to the upper portion of the support shaft 60, and a fixing bolt 64 is fastened to the upper end thereof to hold the rotor 30 and the impeller 20 to break away from the support shaft 60. The fixing bolt 64 prevents the washer 63 supporting the sleeve bearing 61 from an upper portion thereof from being separated.

The waterproof partition wall 12*d* for separating the stator 40 from the rotor 30 at the upper portion of the body case 12 may have the same or greater thickness compared to the cylindrical portion 12*c* of the body case 12 so that the support shaft 60 formed in the support shaft accommodation portion 12*e* may have sufficient support strength when the rotor 30 and the impeller 20 rotate.

In this invention, as will be described later, the air gap between the magnet 32 of the rotor 30 and the stator core 45 of the stator 40, that is, the shoe 412 of each of the teeth 41, is designed to have a significantly reduced interval than the conventional structure. That is, an ultra-thin waterproof coating film 14 having a thickness of about 0.2 mm is formed on an exposed surface 412*d* of the shoe 412 of each of the teeth 41 facing the magnet 32 of the rotor 30.

Therefore, the overall air gap in the electric motor of the present invention is determined to be 1.1 mm, which is obtained by adding the minimum distance of 0.9 mm between the magnet 32 and the waterproof partition wall 12*d* to the thickness of the waterproof coating film 14 of 0.2 mm, but the air gap of the conventional structure is determined to be 1.8 mm, which is obtained by adding the minimum distance of 0.9 mm between the magnet 32 and the waterproof partition wall 12*d* to the thickness of the waterproof partition wall 12*d* of 0.9 mm.

Compared to the conventional air gap in which the stator core is disposed in the inner space of the waterproof partition wall, the air gap of the present invention is significantly shortened to reduce the leakage magnetic flux.

As a result, in the present invention, by forming the waterproof coating film 14 in a relatively less thickness on the exposed surface 412*d* of the shoe 412 of each of the teeth 41 opposite the magnet 32 of the rotor 30, a ferrite magnet, which is a rare-earth-free magnet, may be used as described below.

In other words, the electric motor 100 according to the present invention is an axial gap-type in which a rotor 30 and a stator 40 face each other with a ultra-thin waterproof coating film 14 therebetween, and may be used in an open structure without a separate magnet waterproof structure such as a rare earth magnet. In other words, in the electric motor 100 according to the present invention, since the magnet 32 of the rotor 30 uses a ferrite magnet, the performance of the magnet does not deteriorate even if the magnet is operated for a long time in contact with the cooling water flowing through the fluid flow passage P inside the pump cover 11. Accordingly, the electric motor 100 of the present invention may further reduce an air gap compared to a conventional electric motor employing a rare earth magnet having a magnet waterproof structure to thereby increase efficiency.

In addition, in the present invention, when a longitudinal-axis type electric motor having the same external diameter as a general inner rotor type motor is applied, it is possible to reduce an air gap by separating between the rotor 30 and the stator 40 by using an ultra-thin waterproof coating film 14, and thus even if a ferrite magnet, which is a rare-earth-free magnet, is used, the axial gap-type electric motor having a magnetic energy equivalent to the case of an electric motor using a rare earth magnet containing Nd may be implemented.

The support shaft 60 may be integrated by an insert molding method in which a portion of the support shaft 60 is inserted into the support shaft accommodation portion 12*e* integrally formed at the central portion of the waterproof partition wall 12*d* during injection molding of the body case 12, or may be press-fitted into the support shaft accommodation portion 12*e* integrally formed in the central portion of the waterproof partition wall 12*d*. In this case, a portion of the support shaft accommodation portion 12*e* extends from the waterproof partition wall 12*d* to the lower space 15 thereof and has a sufficient contact area to firmly support the lower end of the support shaft 60.

Hereinafter, the stator of an axial gap-type electric motor according to an embodiment of the present invention will be described.

As shown in FIGS. 3 and 8A to 9, the stator 40 is integrally formed with the waterproof partition wall 12d and the ultra-thin waterproof coating film 14 in the lower space 15 maintaining the sealing state, and is disposed to face the rotor 30 in the axial direction to form an axial gap-type electric motor.

The stator 40 includes: a stator core 45 having a plurality of teeth 41 and an annular back yoke 42 interconnecting the plurality of teeth 41 to form a magnetic circuit; a plurality of bobbins 43 made of an insulating material coupled with an outer circumferential portion of each of the plurality of teeth 41, on which a coil is wound; and a coil 44 wound around the outer circumferential surface of each of the bobbins 43.

In this case, the front end portion (that is, the shoe 412) of each of the plurality of teeth 41 of the stator core 45 is disposed to face the magnet 32 of the rotor 30, and is embedded in the waterproof partition wall 12d of the body case 12.

In addition, an ultra-thin waterproof coating film 14 is formed on the exposed surface of the front end portion of each of the teeth 41 embedded in the waterproof partition wall 12d, that is, the shoe 412. Accordingly, even if the waterproof partition wall 12d is formed as a thick film, an ultra-thin waterproof coating film 14 is formed on the exposed surface of the shoe 412 facing the magnet 32 of the rotor 30. Therefore, it is possible to reduce the air gap in comparison to the conventional structure in which the front end portion of each of the teeth is disposed on the rear surface of the waterproof partition wall.

Figure 8A:
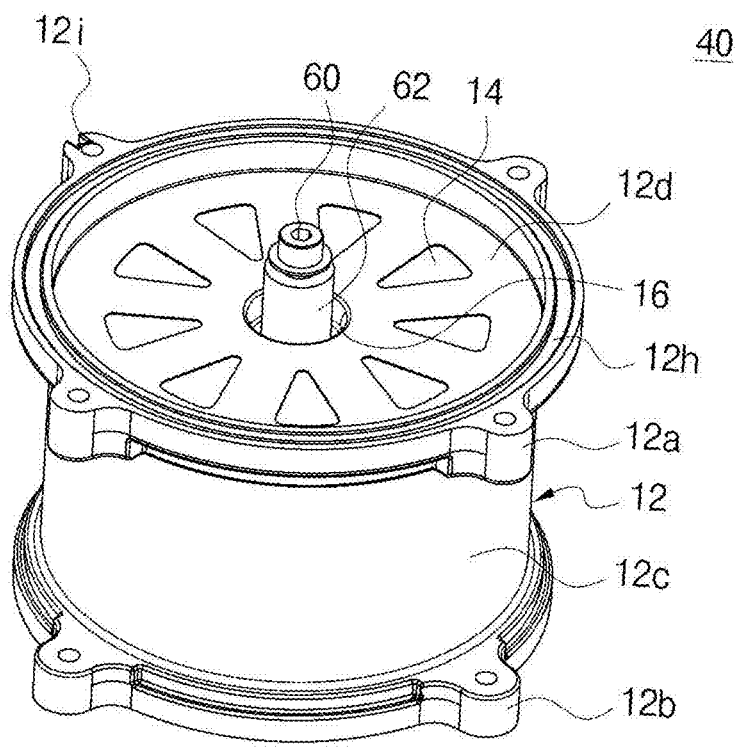
FIGS. 8A to 8E are a perspective view of a stator according to an embodiment of the present disclosure, a perspective view of the stator illustrating a state in which a body case is removed from the stator, an exploded perspective view of the stator, a bottom perspective view of the stator illustrating a state in which a plurality of teeth are insert-molded in a body case, and an exploded perspective view of a division-type stator core and a bobbin, respectively.
Figure 8B:
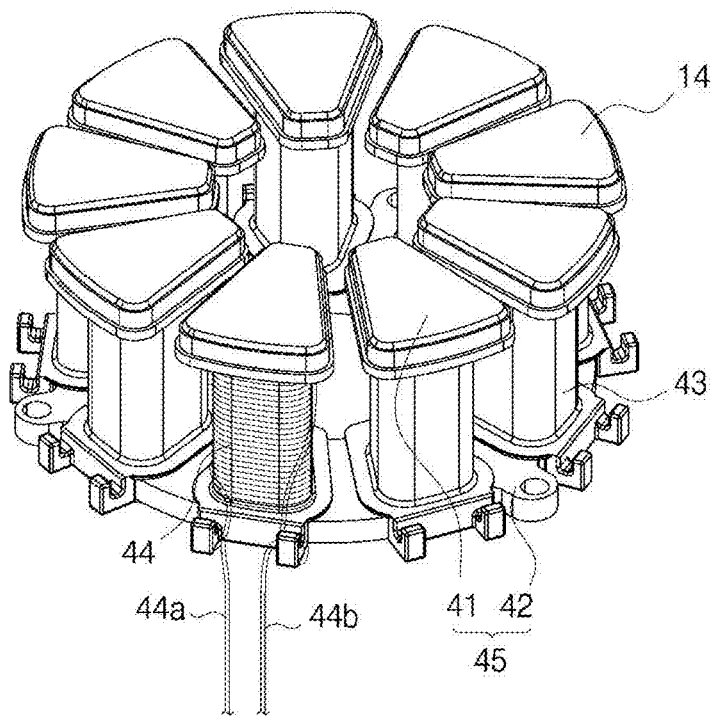
Figure 8C:
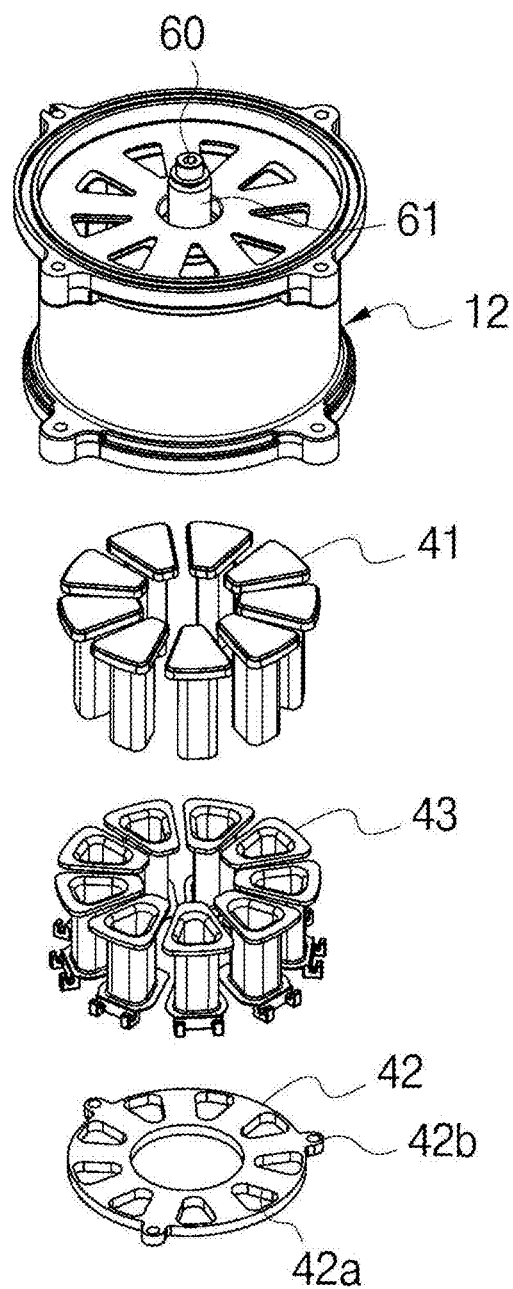
Figure 8D:
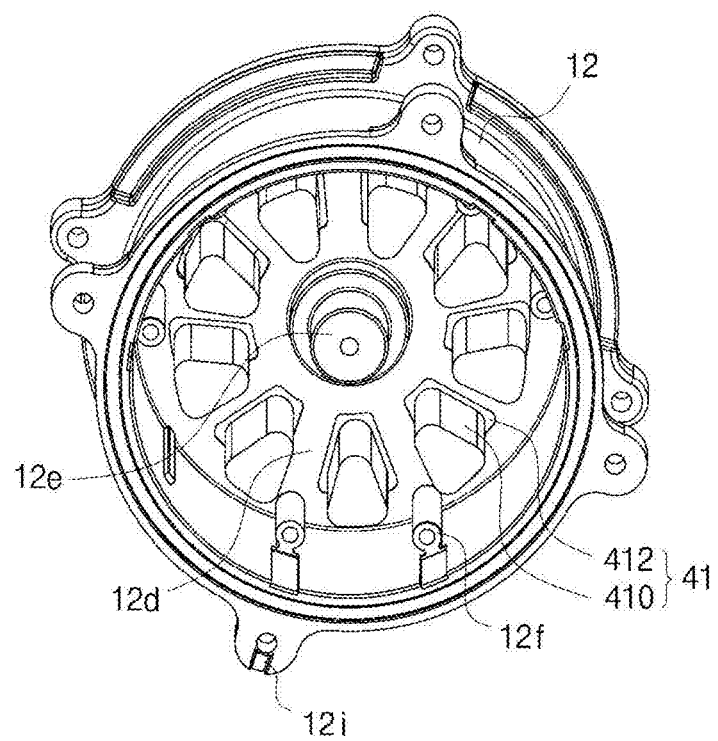
Figure 8E:
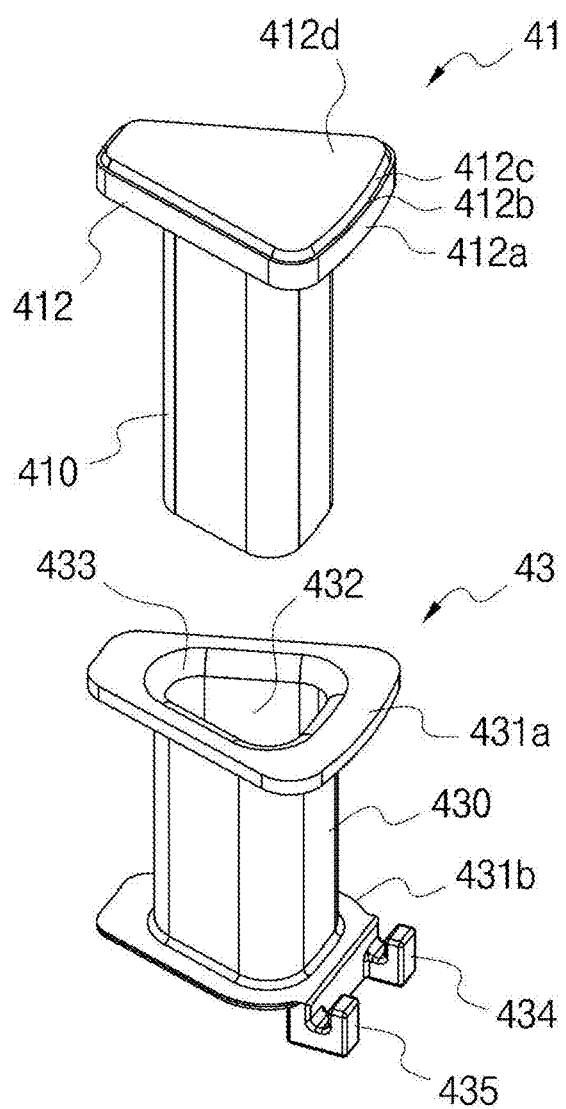

As shown in FIGS. 8B and 8E, the plurality of teeth 41 forming the stator core 45 may be formed in a "T" shape, by compression-molding soft magnetic composites (SMC) powder, and the coil winding portion 410 to which the bobbin 43 is coupled and the shoe portion 412 of the front end portion of each of the teeth are arranged in an annular manner parallel to the axial direction on the same circumference so as to be arranged opposite the magnet 32 of the rotor 30.

The teeth 41 may adopt an isotropic magnetic material having high magnetic permeability, low coercive force, and high saturated magnetic induction as the soft magnetic composites (SMC) powder, for example, powder of alloy, such as Fe—Ni, Fe—Co, and Fe—Si. When the tooth 41 are manufactured using such soft magnetic composites (SMC) powder by a compression molding or extrusion molding method, the teeth 41 may be formed in a 3D structure and the teeth 41 may have an isotropic property.

In addition to compression molding of the soft magnetic composites (SMC) powder, the teeth 41 of the present invention may be molded by mixing amorphous metal powder having a high permeability with a binder, or may be molded by mixing amorphous metal powder, spherical soft magnetic composites (SMC) powder, and a binder at a predetermined ratio. In this case, when the spherical soft magnetic composites (SMC) powder is mixed at a predetermined ratio as compared with the case where 100% of the amorphous metal powder is used, the difficulty of high-pressure sintering can be solved and the permeability can be increased.

As will be described later, the method of compressing and molding the teeth 41 with the soft magnetic composites (SMC) powder is important because the round (R) shape required for curved formation may be easily formed at the front end portion of each of the teeth 41 facing the magnet 32 of the rotor 30, that is, at the shoe portion 412.

A conventional radial gap-type electric motor uses a stator core in which a plurality of teeth are radially arranged on an inner periphery or an outer periphery of a back yoke. When the electrical steel sheets (silicon steel sheets) are blanked (in a connected form) and stacked on the back yoke and the teeth portion, it is not possible to easily form a round (R) shape required for curved surface formation on the core shape, especially the front end portion (i. e., the shoe portion) of each of the teeth facing the magnet 32 of the rotor 30.

Figure 11A:
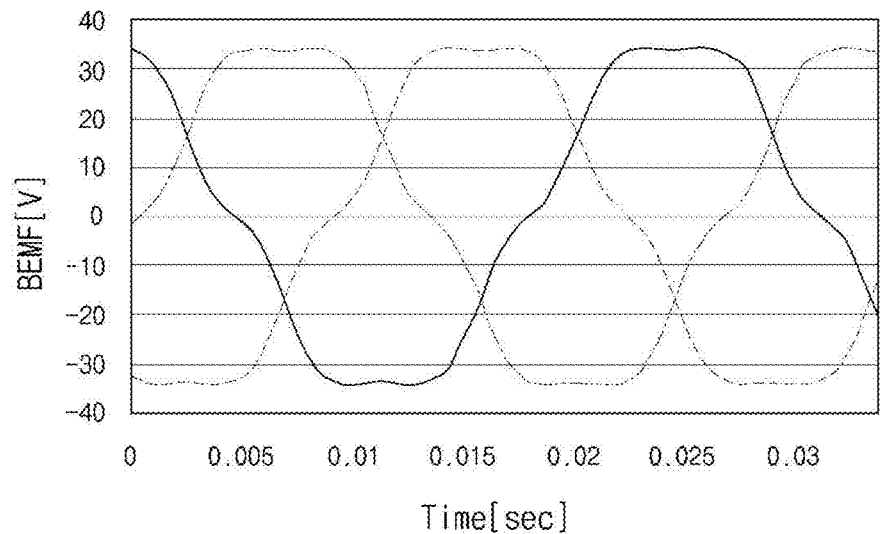
FIGS. 11A and 11B illustrate back-EMF waveforms in the form of a square wave obtained when a round (R) process is not performed on an inner shoe portion of a stator core (teeth) in a conventional inner rotor-type electric motor, and a sinusoidal back-EMF waveform obtained when a round (R) process is performed on an inner shoe portion of a stator core (teeth) in an axial gap-type electric motor according to the present invention, respectively.

As a result, as illustrated in FIG. 11A, a conventional radial gap-type electric motor has a back electronic force (back-EMF) waveform in a square wave form, and thus it is impossible to prevent noise and vibration during rotation of the electric motor.

The stator core 45 of the present invention is applied to an axial gap-type electric motor unlike the stator core of the radial gap-type electric motor, and has a structure in which the plurality of teeth 41 and the back yoke 42 are connected at a right angle, and thus it is impossible to form a thin plate stack integrated with the plurality of teeth and the back yoke.

To solve this problem, in order to obtain the stator core 45 of the present invention, the teeth 41 having a complicated three-dimensional (3D) shape may be manufactured by compression molding soft magnetic composites (SMC) powder, and the back yoke 42 may be prepared by blanking the electric steel sheets (silicon steel sheets), as in the conventional case, and as shown in FIG. 8B, a plurality of soft magnetic composites (SMC) powder teeth 41 are assembled into a plurality of assembly holes 42a of the back yoke 42, to thereby obtain the stator core 45.

Figure 11B:
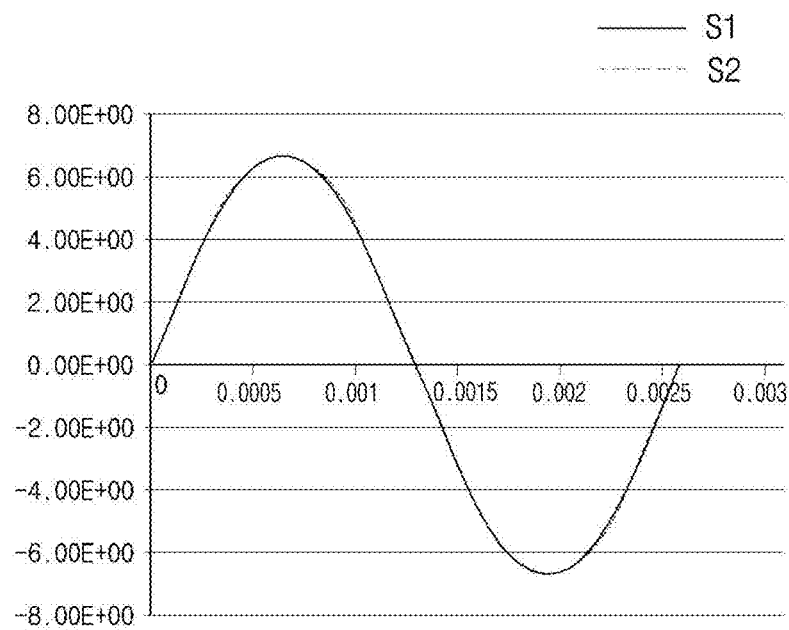

As each of the plurality of teeth 41 formed in the T-shape is prepared by compression-molding soft magnetic composites (SMC) powder, a round (R) shape may be easily formed in the core shape to obtain a back-electromagnetic force waveform (S1: solid line) close to an ideal sine curve (S2: dashed line) as shown in FIG. 11B (distortion: 0.5%). As a result, generation of noise and vibration due to rotation of the electric motor may be improved.

In addition, the stator core 45 of the present invention has a structure in which the plurality of split type teeth 41 and the back yoke 42 are connected at right angles and is specialized for a longitudinal-axis type electric motor. The teeth 41 of the stator core 45 adopt soft magnetic composites (SMC) instead of a general electrical steel sheet, such that the core (teeth) shape may be optimized by introducing a round (R) shape into the teeth shape to minimize the core loss generated in the electric motor.

As shown in FIG. 8E, each of the plurality of split teeth 41 includes a coil winding portion 410 on which the coil is wound and a shoe 412 that extends to a larger area than the coil winding portion 410 at the front end portion of the coil winding portion 410 and opposes the magnet 32 of the rotor 30. Each of the coil winding portion 410 and the shoe 412 has a trapezoidal cross section.

The coil winding portion 410 forms an approximately triangular pillar, the shoe 412 forms an approximately quadrangular pillar, and the edges which are the boundary portions between the side surfaces of each of the shoe 412 and the coil winding portion 410, are rounded in a round (R) shape, so as to be formed as curved surfaces.

The reason why the edges, which are boundary portions between the side surfaces, are rounded in a round (R) shape to form curved surfaces, is because the edge portions may be easily formed when the teeth 41 are formed by compression-molding with the soft magnetic composites (SMC) powder.

In this case, the shoe 412 includes: a stepped portion 412b parallel to the exposed surface 412d; and a C-shaped curved surface portion 412c connecting the exposed surface 412d with the stepped portion 412b at the corner between the trapezoidal side surface 412a and the exposed surface 32 opposing the magnet 32 of the rotor 30.

When the body case 12 is injection-molded, the plurality of split teeth 41 are integrated by placing the shoe 412 at a predetermined interval in the waterproof partition wall 12d by an insert molding method. When the waterproof partition wall 12d of the body case 12 is injection-molded, the waterproof partition wall 12d is formed up to the stepped portion 412b to prevent the teeth 41 from being separated by the magnetic force of the magnet 32 facing the teeth 41.

The C-shaped curved surface portion 412c may allow a back-electromagnetic force waveform (S1) close to an ideal sine curve (S2) to be obtained as shown in FIG. 11B. As a result, noise and vibration generation due to rotation of the electric motor may be improved, and core loss generated in the electric motor may be minimized.

In addition, it is preferable to form a curved surface by round (R) processing at the boundary portion between the coil winding portion 410 and the shoe 412 in the plurality of split teeth 41, and to realize this, forming a space in the mold so that the boundary portion between the coil winding portion 410 and the shoe 412 is not filled during compression molding of the teeth may promote dimensional stability.

Each of the plurality of bobbins 43 includes: a through hole 432 into which the coil winding portion 410 of each of the teeth 41 is inserted, and which is formed at the center of each bobbin; a coil winding body 430 in which a coil 44 is wound around the outer periphery is formed; and upper and lower flanges 431a and 431b which are formed at both ends of the coil winding body 430 to define the region in which the coil 44 is to be wound. A curved introduction portion 433 is provided at the entrance of the coil winding body 430 in consideration of the curved boundary portion between the coil winding portion 410 and the shoe 412 of each of the teeth 41.

In addition, the lower flange 431b placed under the coil winding portion 410 includes first and second alignment guide protrusions 434 and 435 protruding in a U-shaped form to which a start line 44a and an end line 44b of the coil 44 are wound by one turn and fixed and then aligning the start line 44a and the end line 44b of the coil 44 at regular intervals, respectively.

The alignment and extension of the start line 44a and the end line 44b of the coil 44 is very important for assembly productivity when the start line 44a and the end line 44b are assembled through a via hole through hole formed in a via hole region 57a of a printed circuit board (PCB) 51 coupled to the lower side of the stator 40.

A plurality of electrical steel sheets (silicon steel sheets) formed of thin plates are stacked on the rear ends of the plurality of teeth 41, and an annular back yoke 42 having a predetermined width by being coupled to the plurality of teeth 41 to form a magnetic circuit is coupled on the rear ends of the plurality of teeth 41.

The back yoke 42 may be obtained by blanking and preparing an electric steel sheet (silicon steel sheet) as in the prior art, and then assembling a plurality of soft magnetic composites (SMC) powder teeth 41 into a plurality of assembly holes 42a of the back yoke 42 as shown in FIG. 8B.

In addition, a plurality of protrusions 42b with through holes formed in the center thereof are formed on the outer periphery of the back yoke 42. First, the coil winding portion 410 of each of the teeth 41 is coupled with the bobbin 43 wound with the coil 44, and then the lower end of the coil winding portion 410 is coupled to the assembly hole 42a of the back yoke 42 and a fixing screw or fixing bolt is fastened to the through hole of the protrusion 42b to prevent the bobbin and the back yoke from being separated.

Figure 10A:
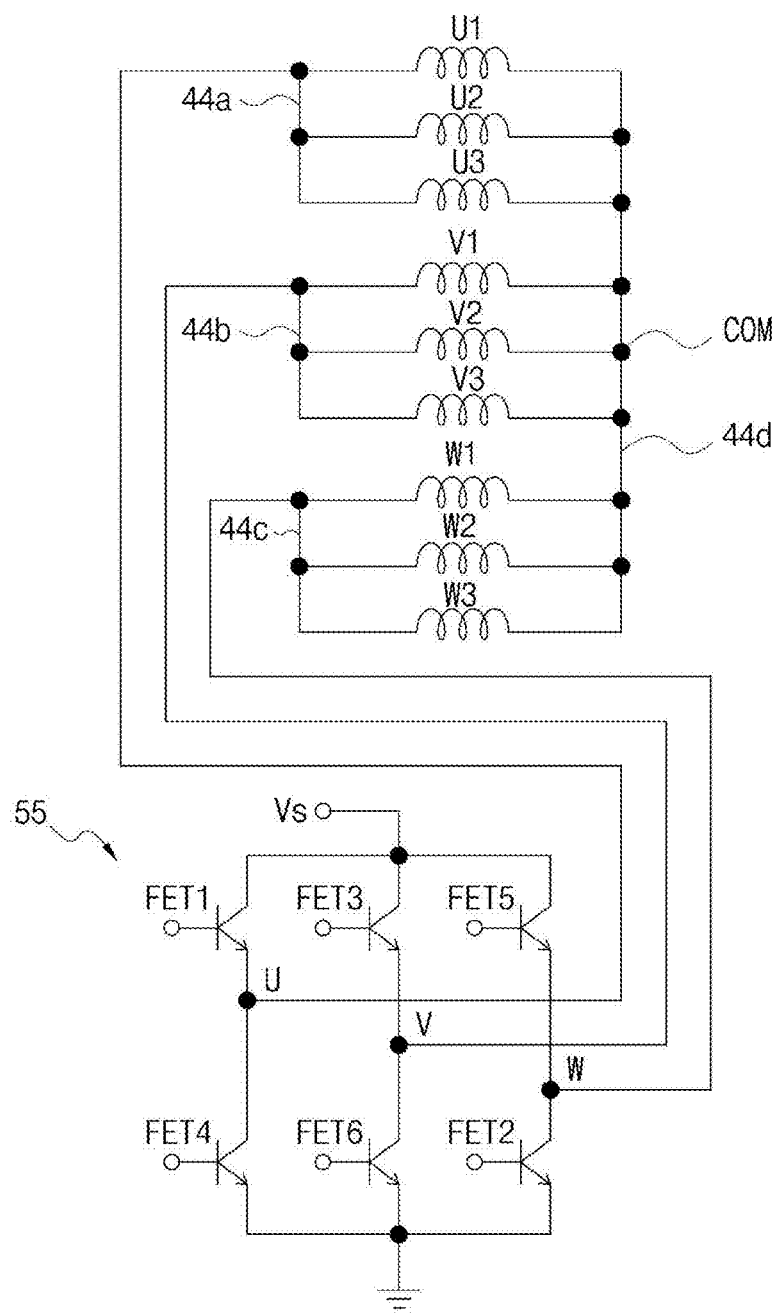
FIGS. 10A and 10B are a circuit diagram showing an equivalent circuit and a motor driving circuit of a stator coil according to the present invention, and a pattern diagram showing a bottom surface of a printed circuit board (PCB), respectively.
Figure 10B:
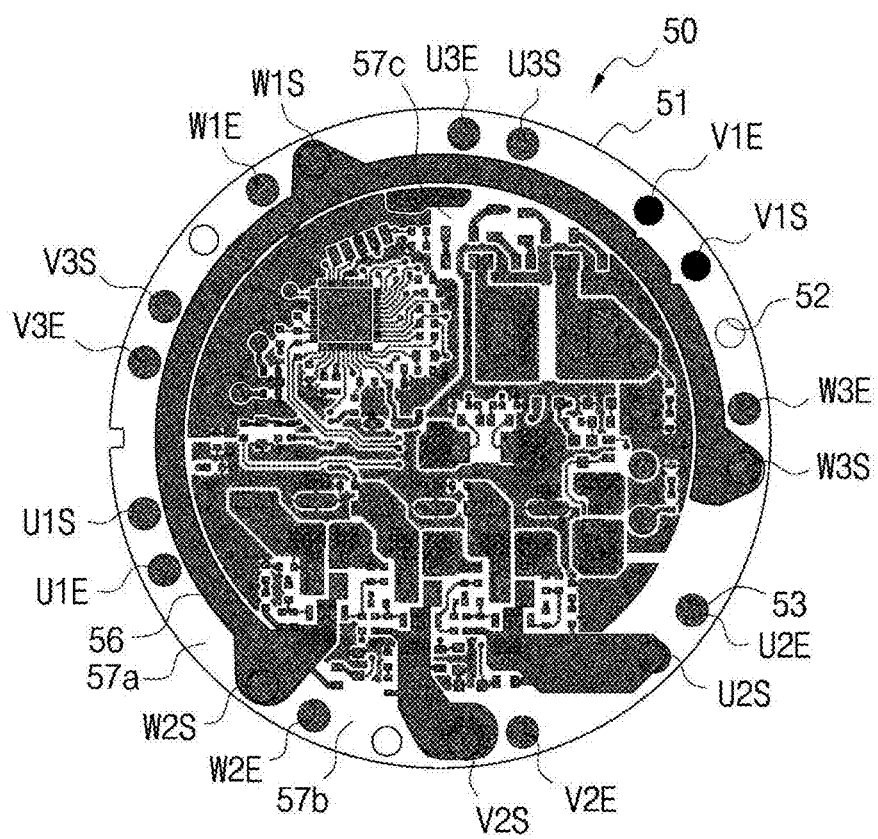

FIGS. 10A and 10B are a circuit diagram showing an equivalent circuit and a motor driving circuit of a stator coil according to the present invention, and a pattern diagram showing a bottom surface of a printed circuit board (PCB), respectively.

A driver 50 for generating a rotating magnetic field by applying a driving signal to a three-phase (U, V, W) coil of the stator 40 is installed in the lower portion of the stator 40. The driver 50 includes a printed circuit board (PCB) 51 on which various electronic components 54 forming a motor driving circuit are mounted.

Three through holes 52 for fixing the printed circuit board (PCB) 51 to the body case 12 are formed on the outer periphery of the printed circuit board (PCB) 51.

As shown in FIG. 8D, six fixing protrusions 12f for fastening fixing screws or fixing bolts protrude from the inner circumference of the cylindrical portion 12c of the body case 12. A female screw thread for fastening a fixing screw or a fixing bolt is formed at the center of each fixing protrusion 12f.

Three of the six fixing protrusions 12f are used to fix the back yoke 42, and the other three are used to fix the printed circuit board (PCB) 51.

In the water pump 200 according to the present invention, the axial gap-type electric motor 100 may be composed of, for example, a brushless direct-current (BLDC) motor having a 12-pole-9-slot or 8-pole-6-slot structure. When the electric motor 100 has a 12-pole-9 slot structure, the coil 44 of the stator 40 is wound on nine teeth 41 in a three-phase U, V, and W structure to construct a circuit, coils U1-U3, V1-V3, and W1-W3 wound around the three teeth 41 for each of the U, V, and W phases are connected in parallel, and the three-phase driving circuit is connected in a Y-connection method, which may be illustrated as shown in FIG. 10A.

As illustrated in FIG. 10A, the coils U1-U3, V1-V3, and W1-W3 of each phase are connected in parallel, and thus the start lines 44a to 44c of each phase are interconnected, and the end lines 44d of all coils U1-U3, V1-V3, and W1-W3 are interconnected to form a neutral point, which is a Y-connection common electrode COM.

Each of the start lines 44a to 44c of the coil U1-U3 allocated to the U phase, the coil V1-V3 allocated to the V phase, and the coil W1-W3 allocated to the W phase are connected in common to the three-phase outputs U, V, and W of the inverter circuit 55 provided in the motor driving circuit, and the end line 44d are all connected to the common electrode COM to form a neutral point.

Furthermore, in the present invention, a total of 18 lines of the start lines 44a to 44c and the end lines 44d of the nine coils U1-U3, V1-V3, and W1-W3 respectively wound around the nine teeth 41 are connected to the conductive pattern 56 of each layer by soldering after respectively having passed through a total of 18 conductive via holes 53 formed on the outer periphery of the circular printed circuit board (PCB) 51 disposed below the stator 40, and having protruded to the lower portion of the PCB 51 as shown in FIG. 10B.

The PCB 51 of the present invention may include, for example, a four-layer multilayer substrate, and FIG. 10B illustrates a lowermost surface, that is, a bottom surface on which the electronic component 54 is mounted.

The PCB 51 may be largely divided into three regions: a via hole region 57a disposed at the outermost side, a connection pattern region 57b disposed at the inside of the via hole region 57a, and an electronic component mounting region 57c located at the inside of the connection pattern region 57b.

In the nine coils U1-U3, V1-V3, and W1-W3, the coils U1-U3 allocated to the U phase, the coils V1-V3 allocated to the V phase, and the coils W1-W3 allocated to the W phase are sequentially arranged for each phase. Accordingly, in the via hole region 57a, for example, as illustrated in FIG. 10B, in 18 conductive via holes 53, the start lines and the end lines U3S, U3E, W1S, W1E, V3S, V3E, U1S, U1E, W2S, W2E, V2S, V2E, U2S, U2E, W3S, W3E, V1S, and V1E of the three U-phase coils U1-U3, the three V-phase coils V1-V3, and the three W-phase coils W1-W3 are arranged in pairs.

In the via hole region 57a, 18 conductive via holes 53 that serve to introduce the start lines 44a to 44c and the end lines 44d of the coils U1-U3, V1-V3, and W1-W3 of each phase to the PCB 51 to realize a parallel connection circuit configuration of the nine coils U1-U3, V1-V3, and W1-W3 wound around the nine teeth 41 of the stator 40, as shown in FIG. 10A, are provided in the form of through holes. In addition, the via hole region 57a is provided with three through holes 52 for fixing the PCB, which are used to fix the PCB 51 to fixed protrusions 12f.

In the connection pattern region 57b, it is necessary to interconnect the start lines 44a to 44c of the nine coils U1-U3, V1-V3, and W1-W3 for each phase, and interconnect the end lines 44d of the nine coils U1-U3, V1-V3, and W1-W3 into one, to realize a parallel connection circuit configuration of the nine coils U1-U3, V1-V3, and W1-W3.

In this invention, a conductive pattern 56 is formed in the connection pattern region 57b to realize a parallel connection circuit configuration in which the start lines 44a to 44c of each phase of the coils U1-U3, V1-V3, and W1-W3 are interconnected in parallel for each surface of a substrate by using a multilayer substrate, or a pattern is formed to connect all end lines 44d to form a common electrode COM.

For example, the conductive pattern 56 formed in the connection pattern region 57b of FIG. 10b shows that three W-phase conductive via holes 53 (W1S, W2S, and W3S) are connected to interconnect the start lines 44b of the three W-phase coils W1-W3.

In the electronic component mounting area 57c, for example, an inverter 55, a controller for generating a driving signal required to drive the inverter 55 and applying the same to the inverter 55, and an electronic component 54 such as a passive element are mounted in order to form a motor driving circuit required to drive a BLDC motor using a radio wave driving method of a 6-step manner using an inverter.

Figure 9:
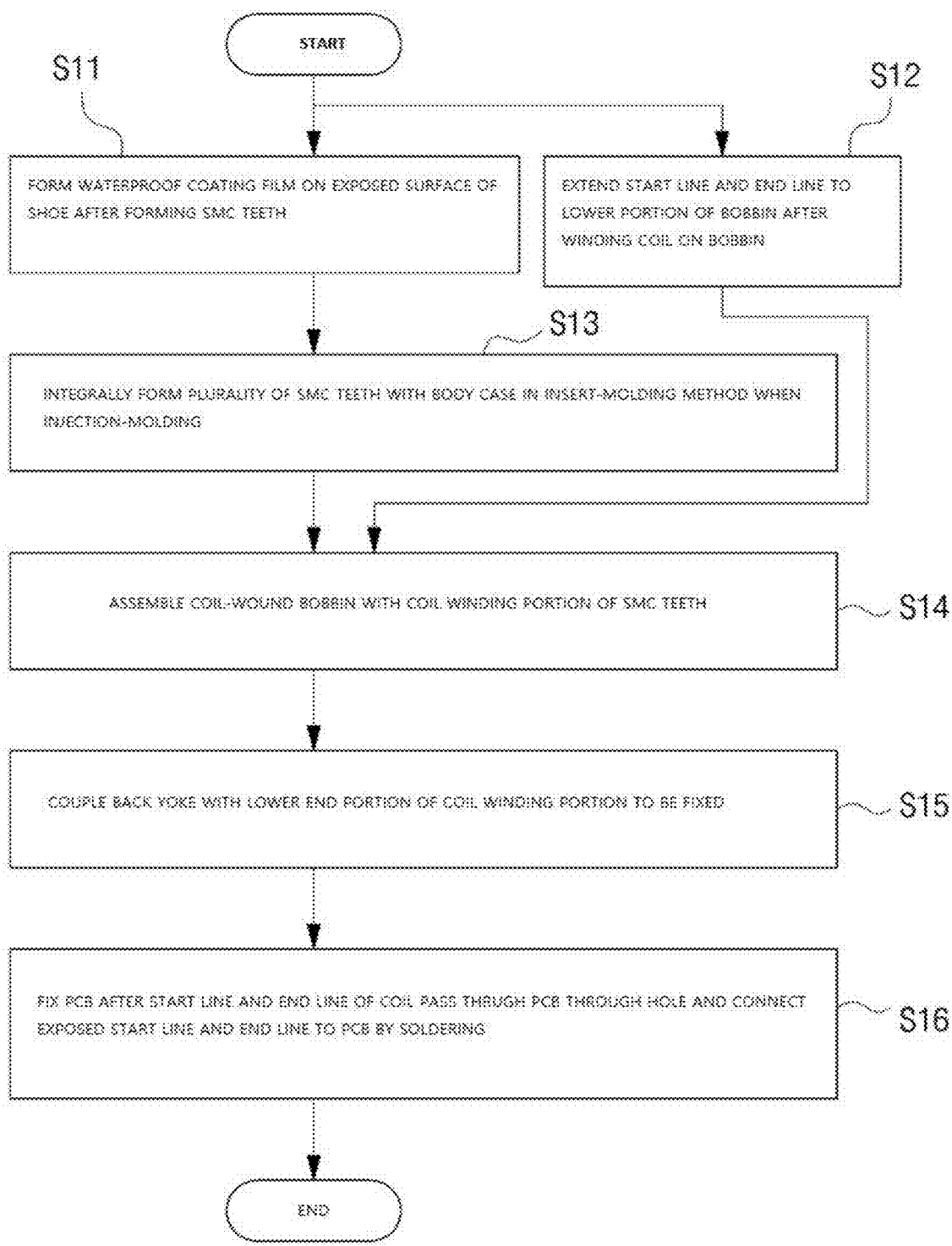
FIG. 9 is a flowchart illustrating a method of manufacturing a stator according to an embodiment of the present invention.

FIG. 9 is a flowchart illustrating a method of manufacturing a stator according to an embodiment of the present invention.

Referring to FIG. 9, first, as shown in FIG. 8E, SMC powders are compressed and molded to manufacture a plurality of teeth 41 having a "T" shape in cross section (S11). Each of the teeth 41 include a coil winding portion 410 coupled to the bobbin 43 and a shoe 412 facing the magnet 32 of the rotor 30.

After that, epoxy is coated, for example, with a thickness of 0.2 mm on the exposed surface 412d of the shoe 412 facing the magnet 32 of the rotor 30 to form an ultra-thin waterproof coating film 14.

In addition, after the coil 44 is wound around the body 430 of the bobbin 43, the start line 44a and the end line 44b of the coil 44 are wound by one turn and fixed to the alignment guide protrusions 434 and 435, and then the front ends of the start line 44a and the end line 44b are aligned at regular intervals and extend by a predetermined length (S12).

Subsequently, as shown in FIG. 8A, the plurality of teeth 411, in each of which the ultra-thin waterproof coating film 14 is formed on the exposed surface 412d of the shoe 412, are arranged in an annular shape around the support shaft accommodation portion 12e, and the exposed surface of the waterproof partition wall 12d above the body case 12 and the waterproof coating film 14 of each of the teeth 41 form a plane of a same height, and as shown in FIG. 8D, the body case 12 is formed on the waterproof partition wall 12d by performing injection molding so that only the shoe 412 of each of the teeth 41 is insert-molded (S13).

Although it has been illustrated in the embodiment that the exposed surface of the waterproof partition wall 12d disposed on the upper portion of the body case 12 and the waterproof coating film 14 of each of the teeth 41 form a plane having a same height, the present invention is not limited thereto.

In the present invention, it is also possible to form an ultra-thin waterproof coating film 14 on the exposed surface 412d of the shoe 412 after insert molding on the waterproof partition wall 12d arranged on the upper portion of the body case 12 using the plurality of teeth 41 in which the ultra-thin waterproof coating film 14 is not formed.

In the injection molding of the body case 12, one end of the support shaft 60 is preferably insert-molded and integrated into the groove 16 of the support shaft accommodation portion 12e.

In addition, during injection molding of the body case 12, the support washer 62 may be inserted into the groove 16 of the support shaft accommodation portion 12e to minimize friction with the lower end portion of the sleeve bearing 61, thereby performing insert molding.

Next, as shown in FIG. 8D, the bobbin 43 having the coil 44 wound around the coil winding portion 410 of each of the teeth 41 extending to the lower portion of the body case 12 is assembled (S14). In this case, the extension portions of the start line 44a and the end line 44b of the coil 44 face a lower portion of the body case 12.

Then, the assembly hole 42a of the back yoke 42 is coupled to the lower end portion of the coil winding portion 410 protruding to the lower end portion of the bobbin 43, and a fixing screw or fixing bolt is fastened to the through hole of the protrusion 42b to prevent the back yoke 42 from being separated (S15). In this case, when the lower end portion of the coil winding portion 410 is coupled to the assembly hole 42a of the back yoke 42, the bobbin 43 serves as a stopper to determine the assembly depth.

In addition, the diameter of the back yoke 42 is set less than the circumference formed by the front end portions of the start line 44a and the end line 44b of the coil 44.

Thereafter, the front end portions of the start line 44a and the end line 44b of the coil 44 facing the lower portion of the body case 12 pass through the 18 through holes in which the conductive via holes 53 of the PCB 51 are formed, and then the PCB 51 is fixed by first fastening a fixing screw or fixing bolt to the three through holes 52 for fixing the PCB 51 (S16).

The PCB 51 is divided into: a via hole region 57a in which a conductive via hole 53 and a through-hole 52 for fixing the PCB are formed at the outermost side; a connection pattern region 57b, which forms a conductive pattern 56 for forming a parallel connection circuit between the coils U1-U3, V1-V3, and W1-W3 of each phase inside the via hole region 57a, or a conductive pattern for forming a common electrode COM; and an electronic component mounting region 57c in which an inverter 55 and various electronic components 54 for forming a motor driving circuit required to drive a BLDC motor inside the connection pattern region 57b are mounted.

The coil 44 of the stator 40 is connected to the motor driving circuit by soldering a start line 44a and an end line 44b of the coil 44 to the conductive via hole 53 of the PCB 51 in which the inverter 55 and various electronic components 54 are mounted in the electronic component mounting region 57c.

As described above, the axial gap-type electric motor 100 for a water pump according to the present invention has a structure in which the stator 40 is placed in the lower space 14 inside the body case 12, which is a waterproof space completely separated from the fluid flow passage P inside the pump cover 11, the rotor 30 is integrally formed with the impeller 20 and is arranged in the fluid flow passage P, and the stator 40 and the rotor 30 are separated by the thick film waterproof partition wall 12b.

In the present invention, the teeth 41 of the stator 40 facing the magnet 32 of the rotor 30 include soft magnetic composites (SMC) powder, and an ultra-thin waterproof coating film 14 is formed on the exposed surface 412d of the shoe 412, and is insert-molded with the waterproof partition walls 12b of the thick film of the body case 12 therebetween.

Therefore, in the axial gap-type electric motor 100 for a water pump according to the present invention, the air gap between the stator 40 and the rotor 30 is set by the waterproof coating film 14 of the ultra-thin film formed on the magnet 32 having an open structure and the front-end exposed surface 412d of each of the teeth 41 without a magnet waterproof structure.

As a result, the electric motor 100 according to the present invention may minimize the air gap compared to the conventional electric motor with the front end portions of the teeth placed inside the waterproof partition wall 12b of the thick film, thereby minimizing the leakage magnetic flux. Therefore, even if a ferrite magnet, which is a rare-earth-free magnet, is used, efficiency and torque equivalent to that of an electric motor using a rare earth magnet may be increased.

In the axial gap-type electric motor 100 according to the present invention, when a water pump control signal is applied to the driver 50 from a control device of the water pump 200 inside the vehicle, the driver 50 receives the position signal of the rotor from a Hall sensor (not shown). In this case, the driver 50 applies a driving signal to the stator coil 44 of the axial gap-type electric motor 100, and the stator 40 generates a rotating magnetic field from the plurality of teeth 41.

When a rotating magnetic field is generated from the plurality of teeth 41 of the stator 40, the rotor 30 arranged in the fluid flow passage P through the ultra-thin waterproof coating film 14 rotates around the support shaft 60 together with the impeller 20. As a result, cooling water is introduced from the inlet 11a of the pump cover 11 according to the rotation of the impeller 20, and the introduced cooling water is discharged to the outlet 11b along the fluid flow passage P.

In the present invention, complete waterproofing of the stator 40 of the electric motor 100 may be realized by driving the impeller 20 and the rotor 30 arranged inside the fluid flow passage P in a magnetic-coupling manner by the stator 40 of the electric motor 100 arranged outside the fluid flow passage P.

Furthermore, in the present disclosure, since the stator 40 of the electric motor 100 is completely separated from the fluid flow passage P, a separate waterproof process may be omitted, and accordingly, an air gap between the rotor 30 and the stator 40 of the electric motor 100 may be set to an optimal state to promote efficiency of the electric motor 100.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention relates to an axial gap-type electric motor employing a rare-earth-free magnet, which may be applied to a longitudinal-axis type permanent magnet synchronous electric motor. The electric motor may be applied to a hybrid vehicle, an electric vehicle, and a fuel cell vehicle and thus, may be applied to an electric water pump (EWP), a compressor, an oil pump, and the like for a cooling device for circulating cooling water for cooling electronic components, batteries, fuel cell stacks, and the like.

What is claimed is:
1. A water pump comprising:
a pump cover having an inlet through which a fluid is introduced and an outlet through which the introduced fluid is discharged, at one side and the other side thereof, respectively;
a body case coupled to the pump cover to form a fluid flow passage inside the pump cover and having a lower space;
an upper cover coupled to a lower end of the body case to set the lower space as a sealing state;
a rotor rotatably supported on the fluid flow passage;
an impeller integrally formed with the rotor on an upper side of the rotor;
a stator arranged in the lower space to generate a rotating magnetic field to rotatably drive the rotor;
a waterproof partition wall arranged on top of the body case to separate between the rotor and the stator; and
a printed circuit board (PCB) on which various electronic components for forming a motor driving circuit for applying a driving signal to U, V, and W 3-phase coils of the stator are mounted,
wherein the stator has a plurality of teeth that are embedded such that a front end portion thereof is embedded in the waterproof partition wall to be exposed to the fluid flow passage,
wherein a waterproof coating film made of a thinner film than the waterproof partition wall is formed at the front end portion of each of the plurality of teeth exposed to the fluid flow passage, and
wherein the PCB comprises:
a via hole region which is arranged in the outermost portion of the PCB, in which a plurality of conductive via holes are formed and a start line and an end line of each of a plurality of coils wound on each of the plurality of teeth are introduced into the PCB to be selectively connected;

a connection pattern region disposed inside the via hole region and having a plurality of conductive patterns for interconnecting the start line and the end line of each of the plurality of coils so as to form a parallel connection circuit or a serial connection circuit of the plurality of coils for each phase; and an electronic component mounting region which is located inside the connection pattern region and in which the various electronic components for forming the motor driving circuit are mounted.

2. The water pump of claim 1, wherein the waterproof coating film serves as an air gap between the rotor and the stator.

3. The water pump of claim 1, wherein the waterproof partition wall and the waterproof coating film form a plane on a same level.

4. The water pump of claim 1, wherein the rotor comprises:

a plurality of magnets arranged in an annular shape; and a back yoke installed on the rear surfaces of the magnets to form a magnetic circuit, wherein the magnets are rare-earth-free magnets.

5. The water pump of claim 1, wherein the stator comprises:

a stator core having a plurality of teeth and a back yoke interconnected with the plurality of teeth to form a magnetic circuit, a plurality of bobbins made of an insulating material, in which a coil of each of the plurality of teeth is coupled to surround an outer circumferential surface of each bobbin on which the coil is wound; and a coil wound around the outer circumferential surfaces of the bobbins, wherein each of the plurality of teeth is made of soft magnetic composites (SMC) powder, the back yoke is made of a plurality of stacked electric steel sheets, each of the plurality of teeth is annularly arranged parallel to the axial direction on the same circumference so as to be arranged to face the magnet of the rotor, the front end portions of the plurality of teeth are embedded in the waterproof partition wall, and a waterproof coating film made of a thinner film than the waterproof partition wall is formed to block exposure to the fluid flow passage.

6. The water pump of claim 5, wherein each of the plurality of teeth comprises:

a coil winding portion on which the coil is wound; and a shoe having a flange extending from the coil winding portion, wherein the shoe includes a stepped portion in which a waterproof partition wall is formed to extend at a corner between the side surface of the flange and the exposed surface facing the magnet of the rotor to prevent the teeth from being separated by magnetic force, and a C-shaped curved surface portion connecting the exposed surface with the stepped portion.

7. The water pump of claim 5, wherein each of the plurality of bobbins comprises:

a coil winding body having a through hole at a center thereof, in which the coil winding portion of each of the teeth is inserted into the through hole and a coil wound around an outer circumference thereof;

upper and lower flanges configured to define a region in which the coil is to be wound on both ends of the coil winding body; and first and second alignment guide protrusions formed on the lower flange to fix a start line and an end line of the coil and then to align the start line and the end line of the coil at regular intervals.

8. The water pump of claim 1, wherein the PCB comprise a multilayer substrate, and the plurality of coils are connected to one common electrode so as to form a parallel connection circuit for each phase, wherein the start lines of the plurality of coils are interconnected to the conductive pattern, and all of the end lines form a Y-connection neutral point, which is connected to a common electrode.

9. The water pump of claim 1, wherein the stator core comprises:

a plurality of teeth annularly arranged on the same circumference in parallel to the axial direction so as to face the magnet of the rotor; and a back yoke connected to the plurality of teeth at a right angle to form a magnetic circuit, wherein the front end portions of the plurality of teeth are embedded in the waterproof partition wall, and a waterproof coating film made of a thinner film than the waterproof partition wall is formed to block exposure to the fluid flow passage.

10. The water pump of claim 1, further comprising:

a support shaft accommodation portion integrally extending in a lower space direction at the center of the waterproof partition wall and having first to third end grooves formed at the center thereof;

a support shaft having a lower end portion supported on a third end groove of the support shaft accommodation portion;

a sleeve bearing coupled to the outer periphery of the support shaft to rotatably support the rotor and to have the lower end portion supported by the second groove; and a bearing housing accommodating the sleeve bearing and having the lower end portion inserted into the first end groove, wherein the bearing housing is connected to the center of the stator support integrally formed in a lower plate of the impeller and accommodating the rotor therein.

* * * * *